United States Patent [19]

Maier et al.

[11] Patent Number: 4,619,170
[45] Date of Patent: Oct. 28, 1986

[54] GUIDE FOR A HAND POWER TOOL

[76] Inventors: Peter Maier, Gerokstrasse 1, 7311 Neidlingen; Gernot Hänsel, Gerstenstrasse 31, 7000 Stuttgart 70, both of Fed. Rep. of Germany

[21] Appl. No.: 679,757

[22] Filed: Dec. 10, 1984

[30] Foreign Application Priority Data

Dec. 10, 1983 [DE] Fed. Rep. of Germany ....... 3344732

[51] Int. Cl.$^4$ .............................................. B27B 9/04
[52] U.S. Cl. ....................................... 83/745; 30/372; 30/388
[58] Field of Search ............................ 30/290, 372, 388; 83/471.2, 471.3, 486.1, 743, 744, 745; 308/3 A, 3 R, 6 R; 408/178, 180

[56] References Cited

U.S. PATENT DOCUMENTS

| | | | |
|---|---|---|---|
| 1,381,188 | 6/1921 | Gury | 308/3 A |
| 2,773,523 | 12/1956 | Hopla | 83/745 |
| 2,942,633 | 6/1960 | King | 83/745 |
| 4,202,233 | 5/1980 | Larson | 83/574 X |
| 4,224,855 | 9/1980 | Des Roches | 83/745 |
| 4,248,101 | 2/1981 | Santoro | 308/3 R X |

FOREIGN PATENT DOCUMENTS

| | | | |
|---|---|---|---|
| 2302448 | 10/1976 | Fed. Rep. of Germany | 308/3 A |
| 667977 | 3/1952 | United Kingdom | 308/3 A |

*Primary Examiner*—James M. Meister
*Assistant Examiner*—Michael D. Folkerts
*Attorney, Agent, or Firm*—McGlew and Tuttle

[57] ABSTRACT

A guide device for a hand circular saw or the like has a guide plate with a non-slip coating on its lower face to make contact with the work, and a foot plate running along the guide plate and carrying the saw or the like thereon. The foot plate has a recess thereon which enables it to completely straddle the guide plate while giving lateral guidance. In the recess there are spring loaded rollers or shoes pressing on the guide plate.

14 Claims, 3 Drawing Figures

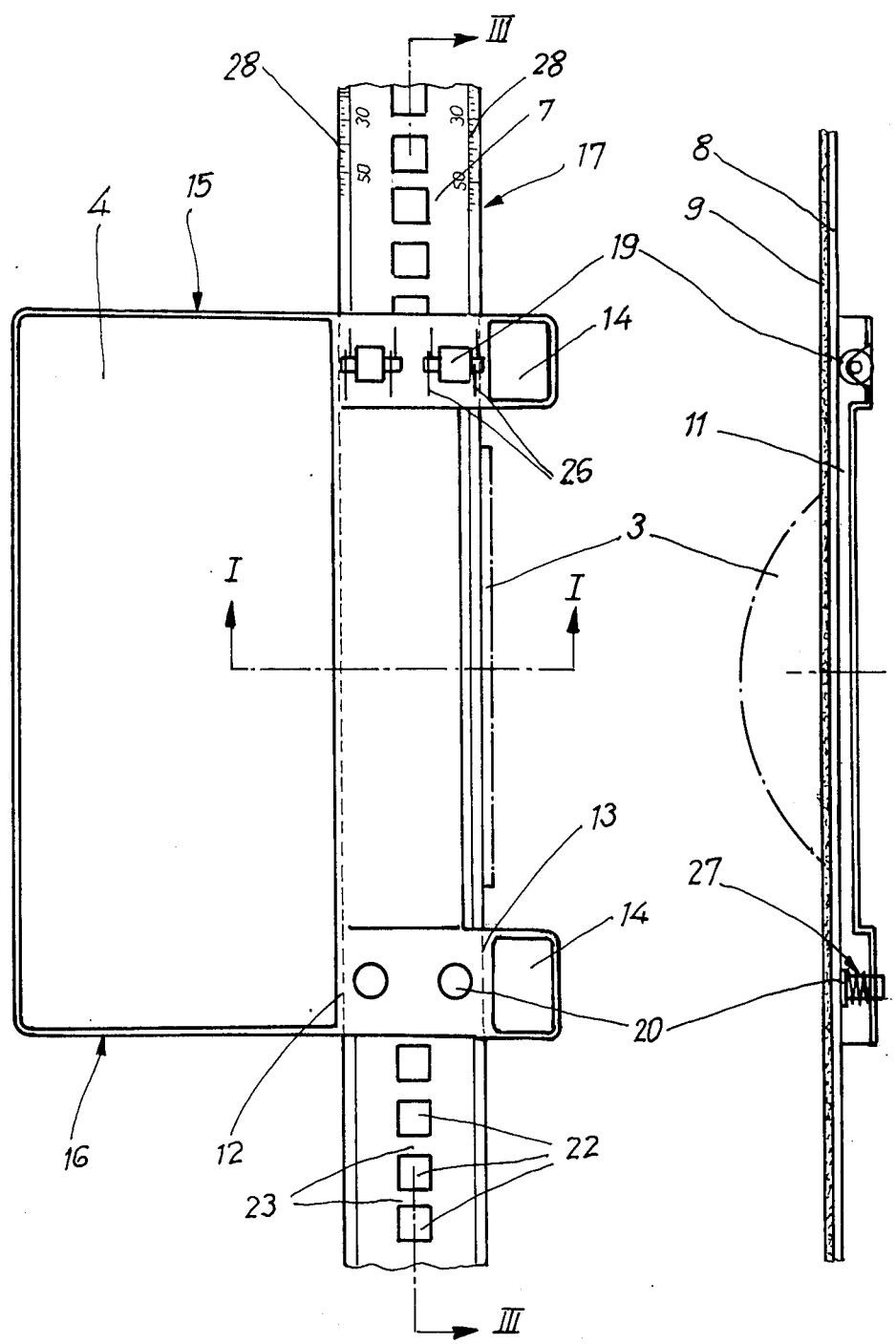

GUIDE FOR A HAND POWER TOOL

BACKGROUND OF THE INVENTION

The present invention relates to a guide device for a hand power tool, as for example a circular saw or a router, running over the work, and more particularly though not exclusively to such a device comprising a guide plate adapted to be laid on the work and a foot plate fixed to the tool so that it may be placed on the guide plate and moved along thereon.

Such a guide dive has been previously proposed in the German patent application No. P 32 43 564.9. It is however involved in its design and more specially suffers from the drawback that the foot plate, when running on the guide plate, is at some distance from the work that is to be machined or cut, such distance being equal to the thickness of the guide plate. This length will mean that the possible depth of cut of the saw is decreased by an equivalent amount.

SHORT OVERVIEW OF THE PRESENT INVENTION

One object of the instant invention is to take care of such shortcomings of previously proposed devices.

A further object of the invention is to design a guide device for hand power tools that is very much simpler in its structure and may be produced at a lower price.

A still further aim of the invention is to make possible such a device which does not lead to a loss in the depth of cut.

In order to attain these and other objects of the invention what will become clear on reading the following account, the guide plate has the form of an elongated band with a generally rectangular cross section and the foot plate is made with a recess enabling the guide plate to fit within the foot plate with a sideways guiding action, the guide plate taking up a position in which it is fully within in the recess.

This design of the guide plate in the form of an elongated band enables low-price manufacture from a metal or synthetic resin strip. Because the guide plate is completely taken up within the foot plate the outcome is an arrangement, in which the surface of the work functions as the support face for the hand power tool. The outcome is a dependable guiding action for the hand power tool without any loss in the depth of cut.

Various different forms of the invention are possible.

As one possible development of the main idea of the invention, an edge forming a limit of the recess is at a very small distance from the machining edge (as for example the side of a circular saw blade) of the hand power tool. As a result the said machining edge will then be in a position very close to one rim of the guide plate. The guide plate may then be placed, like a rule, directly on that part of the work, where the edge is to be produced by sawing or routing. This system makes possible a simple and convenient way of precisely determining the position of the work as machined.

As a further outgrowth of the invention it is possible to have a resilient element in the recess so that when the foot plate has been put in position it acts upon the guide plate and exerts a pressing force on the work. Such a design keeps the guide plate from sliding out of position while the work is being cut.

It is furthermore possible to have at least one spring-loaded wheel member placed in the recess which runs on the surface of the guide plate when the foot plate has been put in place. There may be at least one spring-loaded shoe in the recess. This reduces the amount of friction of the hand power tool when running on the guide plate.

The wheel member may be kept in place by two resiliently acting bails fixed on the top wall of the recess on both sides of the wheel member and the shoe may be guided normal to the length direction of the recess and parallel to its side limiting walls and is acted upon by the force of a helical compression spring, that acts on a collar on the shoe and on the top wall of the recess. With such features the device of the invention, which is particularly simple in structure, only has a small number of parts and is low in price.

The guide plate may have a number of openings therein to make possible the insertion of a screw clamp so that the guide plate may then be simply and conveniently fixed in place on the work using an unspecialized or generally available design of clamp which is cheap in price.

The through openings may be arranged in a central row in the guide plate and may have a generally square form and have a distance between them that is smaller than the length of one side of such square. It is then possible for the guide plate to be secured in place wherever desired on the most different sizes of work.

The wheel members or the slide shoes may be placed in pairs opposite each other and at some distance from the center point of the recess. This gives a two-point supporting contact of the foot plate on the guide plate so that the guiding action is very steady. Such an arrangement at the same time means that the friction-reducing means between the foot plate and the guide plate is not able to run onto the screw clamps used for keeping the guide plate in its desired position. The hand power tool then may be moved over the full length of the guide plate as clamped in place without any trouble.

The guide plate may have at least one, or more particularly two, length scales on its two long edges so that the guide plate of the invention also functions as a ruler and the edges of the sawn or routed cut may be placed in exactly the desired position so that the guide device of the invention is more convenient to use.

The foot plate may have at least one bar member delimiting the recess at one side thereof. In particular, there may be two such bar members placed at the edges of the foot plate that are to the front and the back in the direction of feed, the hand power tool operating between the said bar members. This means that the tool is kept steady when being used and the construction is generally compact and simple.

On its lower side turned towards the work the guide plate may have a non-slip coating of for example rubber, plastic or the like that may be produced in situ by spraying or separately and then joined to the plate by adhesive or by an interlocking joint. Such a coating will then mean that the guide plate is frictionally held in place on the work to be operated on without any chance of slipping, the guide plate simply being laid on the work in the desired position. No separate attachment means will then be needed and this makes the guide means of the invention particularly simple to handle and quick to operate. The guide plate will only have to be fixed in placed on the work, for example with screw clamps, if it has a very smooth surface.

Further useful effects of the invention will be seen from the following account of one working example thereof as viewed in the accompanying drawings, that are in part diagrammatic.

LIST OF DIFFERENT VIEWS OF THE FIGURES

FIG. 2 is a plan view of the guide device.

FIG. 3 is a lengthways section of the guide device taken on the line III—III of FIG. 2.

DETAILED ACCOUNT OF WORKING EXAMPLE OF THE INVENTION

Figure 1:
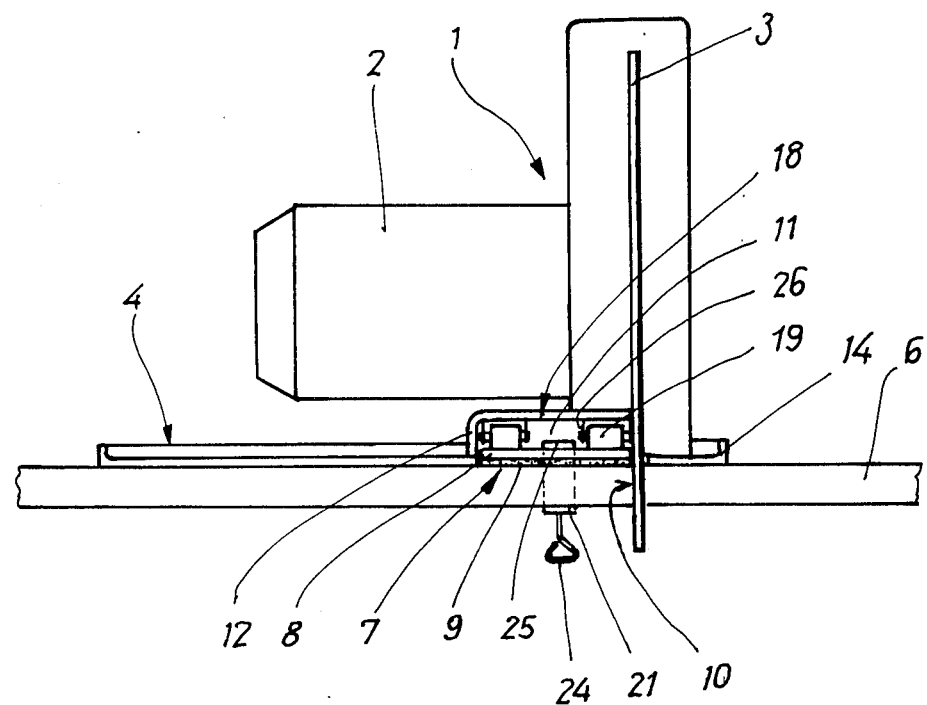
FIG. 1 is a partly sectional view of the guide device of the present invention on the line I—I of FIG. 2.

Turning firstly to FIG. 1, the reader will see an example of one form of circular saw 1, which the guide device of the invention is used with. The circular saw is but one example of a hand power saw, and various other possible forms of tool are possible, like more specially for example hand-held saws and routers such as keyhole saws and other saws held over the work. The circular saw has a motor housing 2 accommodating an electric drive motor that is not shown. The drive shaft of the motor carries a saw blade 3, that is placed within a guard so that the greater part of its circumference is within it. A grip (not shown either) is formed on the motor housing 2 so that the circular saw 1 may be held by the person using it.

The circular saw 1 is fixed to a foot plate 4, that is located under the motor housing 2 and in fact forms a foot of the saw 1. The saw blade 3 projects downwards past the lower side, turned away from the motor housing 2, of the foot plate 4. The amount of such projection determines the depth of cut of the circular saw 1, when it is moved over a piece of work 6 to be cut up.

The foot plate 4 is a part of the guide device of the invention, that positively guides the hand power tool in order to produce cuts or edges that are as straight as possible. To this end there is a non-slip guide plate 7 that may be placed on the work 6. The guide plate 7 has the form of an elongated band with a generally rectangular cross section. The band may more specially be fashioned of a metal or synthetic resin strip 8, that on its lower face turned towards the work bears a non-slip coating 9. The coating may for example be made of rubber, synthetic resin or the like. It is permanently joined to the band 8, as for example by adhesive, or positively joined thereto or it may be sprayed on. As a positive form of joint it is more specially possible to have a feather and groove joint, in the case of which buttons, ribs or the like on the coating 9 fit into mating retaining structures in or on the band 8 and are locked therein because of their elasticity.

The guide plate 7 is placed right next to the cut or edge 10 to be produced on the topside of the work 6, on which it is kept in place by the coating 9. The foot plate 4 has a recess 11, by means of which it mounted on the guide plate 7 straddling same, the foot plate 4 then fitting round the guide plate 7 and resting thereon so that it is located in a sideways direction on the guide plate 7, i.e. stopped from moving sideways in relation thereto by the side edge of the band 8 and those faces of the foot plate 4, that form the side walls of the recess 11. In FIG. 1 the reader will only see one (12) of these limit walls, the side, turned away from the blade 3, of the foot plate 4 resting against the guide plate 7. The limiting wall 13 on the opposite side of the guide plate 7 is generally at the same level as the saw blade 3, by which it is covered in the form of cut shown.

Referring to FIG. 2, the guide plate 7 will be seen in plan view with the foot plate 4 mounted thereon. Details of the circular saw 1 have been omitted from the figure in order to make it more straightforward; only the saw blade 3 will be seen in its operating position right at the edge of the guide plate 7. The foot plate 4 has the greater part of its surface resting on the side, facing away from the saw blade 3, of the guide plate 7. On the saw blade side on the other hand there are only two bar members 14 at the edges 15 and 16, that are to the front and the back in the direction feed, of the foot plate 4 so that the foot plate 4 fits round the guide plate 7 at the bar members 14. The bar members 14 form a flat mounting face that is at the same level as the mounting or support face of the foot plate beyond the guide plate 7 and they have an upwardly angled side limiting wall 13 that makes contact with the guide plate 7. Between the bar members 14 the foot plate 4 is recessed back to a level beyond the edge 17 of the guide plate 7 so that it only makes contact with the latter on one side. The cutting element of the hand power tool—in the present case, the saw blade 3—is preferably mounted centrally between the bar members 14, it then directly acting on the edge 17 of the guide plate 7. The cut or routed edge produced is for this reason only at a very small distance from the edge 17. Furthermore the design of the foot plate 4 described means that there is a firm engagement of the hand power tool on the work 6 without any danger of the tool tilting and the bar members 14, that are spaced as far as possible from each other, mean that the device is guided without any chance of slipping sideways on the guide plate 7, there being a sort of two-point engagement.

Reverting now to FIG. 1, it will be seen that, when the guide plate 7 is put on, the guide plate 7 is completely in the recess 11. When the work is being cut, the foot plate 4 therefore comes to rest directly on the surface of the work 5, as is indeed the case in an operation without the guide device in keeping with the invention. The guide device does therefore not have any undesired effects as regards the depth of cut of the tool, as for example of the saw blade 3.

A number of different possible measures are possible to ensure that the guide plate 7 is in firm and non-slip engagement with the work 6. To this end the invention uses a spring element placed in the recess 11, so that when the foot plate 4 is put in place the element acts on the guide plate 7 and exerts a pressing force on the work. As will be seen from FIGS. 1 and 3, the foot plate 4 is so formed over the guide plate 7 that the top wall 18 of the recess 11 takes up a position at a higher level than the guide plate 7. This means on the one hand that the guiding effect only takes place at the side edges round the recess 11 (of which one as noted runs at a very small distance from the edge cut by the hand power tool) and on the other hand there is enough space to accommodate the spring elements.

As will be seen from FIG. 3, the recess 11 is widened out in steps near the bar members 14 so that the guide plate 4 bridges over the recess 11 like a gantry or portal. In the wider part of the recess 11 there are spring loaded wheel members 19 or sliding shoes 20, that run on the topside of the guide plate 7 and give the desired loading pressure. The use of wheel members or sliding shoes means that the foot plate 4 is able to run on the guide plate 7 with little friction. The invention is not limited to the working example shown, that has two different possible constructions of the spring loaded anti-friction means. It would naturally be possible to have exclusively wheel members 19 or shoes 20.

The wheel members 19 or the shoes 20 are placed in pairs opposite each other at a distance from the center of recess 11, this giving two point support along a line running across the length direction of the guide plate 7, that makes for a steady and firm guiding action while at the same time serving to evenly transmit force to the guide plate 7. This system furthermore avoids having any collision with screw clamps 21 (if any), that may be present as an additional means for keeping the guide plate 7 in place and are to be fixed its middle part. As will be seen from FIG. 2, the guide plate 7 has a number of through openings 22 to enable the screw clamps 21 to be put in place. The openings 22 are placed centrally in a row on the guide plate 7. In the illustrated working example of the invention they have a generally square form with a distance between them less than the length of the edge of such a square. The bridges or webs 23 left between the openings 22 function as a point of engagement for a screw clamp 21 to be used therewith. The line of openings 22 and 23 runs along the full length of the guide plate 7 so that it is possible for the work 6 to be clamped down at any desired position.

Returning to FIG. 1, it is to be noted that preferably regular or non-customized screw clamps 21 are to be used, as like those supplied for fretwork. For fixing the guide plate 7 on the work 6 the bail of such a screw clamp 21 is threaded through an opening 22 in line with the size of the work 6 so that the arm 25 opposite to the tightening screw 24 and parallel to the length direction of the guide plate 7 comes to rest against one of the webs 23. The outline of the openings 22 is in this respect specially convenient for the rocking of the screw clamp 21 and it furthermore gives rise to a certain amount of play for maneuvering so that even after the screw clamps 21 have been put on, the guide plate 7 may still be adjusted in position to a certain degree. The guide plate 7 is then locked by tightening up the screw 24, that acts against the lower side of the work 6.

The fixing in place of the guide plate 7 in keeping with the invention using clamps 21 constitutes a securing operation that is not necessary in most cases owing to the anti-slip coating 9. It is only in the case of very smooth workpieces that it is best to lock the guide plate 7 in place like this.

The arm 25 of the clamp 24 comes to take up a position inside the recess 11 at a distance from the top wall 18 thereof and the wheel members 19 or the shoes 20 run on the two sides of the clamp 21 and next thereto. The displacement of the foot plate 4 on the guide plate 7 is therefore not impeded by the use of one or more clamps 21; in particular, in every case the full length of the guide plate 7 is available of the positive guidance of the hand power tool.

In the illustrated working example the wheel members 19 are mounted in two respective spring bails 26 that are mounted on the two sides of the wheel members 19 on the top wall 18 of the recess 11 and carry a bearing for the axles of the wheel members. The bails 26 are in this respect so sized that on putting on the foot plate 4 the wheel members 19 make contact with the surface of the guide plate 7 and are displaced. For this reason the bails 26 are tensioned and the desired pressing force is bought to bear on the guide plate 7. On displacing the hand power tool the wheel members 19 run along on the surface of the guide plate 7 so that the guiding effect is smooth and without much friction.

As an alternative to the wheel members 19 it is possible to use a shoe 20, that is guided in a direction normal to the length direction of the recess 11 and parallel to the side walls 12 and 13 and is acted on by the force of a spring, as for example one in the form of a helical compression spring. In the design to be seen in FIG. 3, the shoe 30 has a plate-like or flat head resting on the guide plate 7. A stem 20 of the shoe 20 is mounted in the foot plate 4 and the helical compression spring is placed round the stem. The helical compression spring 27 has one of its ends resting against a collar on the shoe 20, while the other end rests against the top wall 18 of the recess 11. On placing the foot plate 4 on the guide plate 7 the shoe 20 is forced into the inside of the recess 11 so that the helical compression spring 27 is tensioned and a loading force will be exerted on the guide plate 7.

In keeping with a preferred form of the invention the guide plate 7 has at least one length scale 28 thereon so that it may simultaneously be used as a ruler. Preferably, the guide plate 7 has two length scales 28 placed on its two long edges, that may for example be bonded or printed thereon. The guide plate is in this respect made completely symmetrically in design and may be used while pointing in any direction. The fact that there are two scales 28 means that there is a greater degree of certainty in measuring the length of cuts or cut edges inasfar as if one of the scales should be buried in shavings, the second scale will still be able to be used.

In the illustrated working example the foot plate 4 running on the guide plate 7 is the foot or leg of a hand power tool. This is however not necessarily the case, and the foot plate 4 may be a completely separate part that is to be detachably joined to the hand power tool.

We claim:

1. A guide device for a hand power tool which is movable in a feed direction to make a cut in a work, comprising a guide plate adapted to be placed on a work to be cut and a foot plate adapted to be placed on said guide plate, said foot plate being fixed to said tool and being movable along said guide plate in the feed direction for guiding said tool in the feed direction, said guide plate having the form of an elongated band with an edge lying substantially at the cut to be made by said tool while it is guided in the feed direction on said guide plate, said foot plate having a pair of bar members thereon and spaced from each other in the feed direction, each bar member having a recess therein to receive said guide plate, and each bar member straddling said guide plate with said guide plate substantially fully within said recess of each bar member in the space, said tool being fixed to said foot plate in position to prevent lateral movement of said foot plate on said guide plate.

2. A guide device according to claim 1, wherein said foot plate has forward and rear edges with respect to said feed direction, said bar members being positioned at said forward and rear edges respectively.

3. A guide device according to claim 2, wherein said foot plate has a lower surface which is coplanar with a lower surface of said guide plate at locations spaced away from said guide plate with said foot plate engaged on said guide plate.

4. The guide device as claimed in claim 1 comprising a spring element within one recess to act upon said guide plate when said foot plate is placed straddlingly thereon.

5. The guide device as claimed in claim 4 comprising at least one wheel member in said one recess for acting on a top face of said guide plate when said foot plate is placed thereon.

6. The guide device as claimed in claim 5 comprising two spring bails supporting said wheel member, said bails being mounted on two sides of said wheel member on an upper wall of said recess and having bearings taking up an axle forming part of said wheel member.

7. The guide device as claimed in claim 4 comprising at least one spring loaded shoe in said one recess.

8. The guide device as claimed in claim 7 comprising means for guiding said shoe parallel to a length direction of said one recess and parallel to said limiting walls thereof, and a helical compression spring acting on said shoe by way of a collar formed thereon, one end of said spring acting on a top wall of said recess.

9. The guide device as claimed in claim 7 wherein said shoes are placed in pairs opposite each other spaced out on either side of a center line of said one recess running in the direction of said guide plate.

10. The guide device as claimed in claim 4 comprising wheel members placed in pairs opposite each other spaced out on either side of a center line of said one recess running in the direction of said guide plate.

11. The guide device as claimed in claim 1 wherein said guide plate has openings therein for the insertion of a screw clamp.

12. The guide device as claimed in claim 11 wherein said openings are of generally square form and placed in a line extending along the guide plate in the middle thereof, the spacing between the openings being generally less than the length of an edge of one such opening.

13. The guide device as claimed in claim 1 wherein said guide face has a frictional coating on a lower side thereof for engaging said work.

14. The guide device as claimed in claim 13 wherein said coating is formed in situ on said guide plate.

* * * * *